Oct. 1, 1963    E. S. RAILA ETAL    3,105,870
ISOLATING COUPLING FOR CONDUCTORS
Filed March 6, 1961

EDWARD S. RAILA
PETER GRECO
INVENTORS

BY Ernest Fameick

ATTORNEY.

United States Patent Office 3,105,870
Patented Oct. 1, 1963

3,105,870
ISOLATING COUPLING FOR CONDUCTORS
Edward S. Raila and Peter Greco, Norwalk, Conn., assignors to Burndy Corporation, a corporation of New York
Filed Mar. 6, 1961, Ser. No. 94,664
3 Claims. (Cl. 174—85)

Our invention relates to wiring splicers, and more particularly to electrical splicing connectors known as sectionalizers. Such devices may be used to simplify wiring installation of new series street lights or utilized in existing street lighting circuits, or for sectionalizing a circuit without dead-ending the wire.

This application is a continuation-in-part of S.N. 828,623, filed on July 21, 1959 now abandoned.

The principal objects of our invention are to design a sectionalizer that reduces the over-all length hitherto deemed necessary; and which is easier to install and more economical to manufacture.

We accompilsh these and other objects and obtain our new results as will be apparent from the device described in the following specification, particularly pointed out in the claims and illustrated in the accompanying drawing in which:

Figure 1:
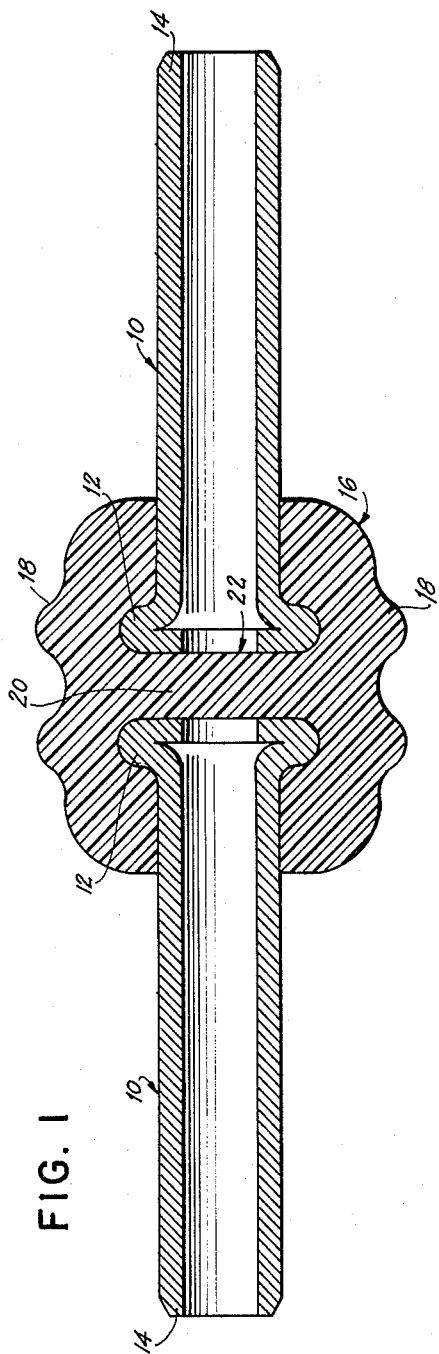
FIG. 1 represents a longitudinal sectional view through our device.
Figure 2:
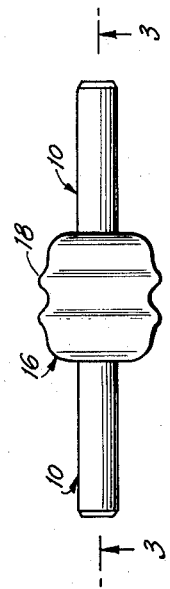
FIG. 2 is a side elevation of the device.
Figure 3:
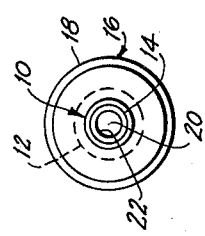
FIG. 3 is an end view thereof.

We accomplish the objects of our invention by employing a tubular socket member, preferably made of the same material as the cable or wire being joined. One end of the socket member is upset to provide a suitable anchor for use within a molded insulator of special design.

Specifically in the drawing, a tube is cut into suitable lengths forming socket member 10. An anchor portion 12 is provided at one end of the socket member such as by heading. A conductor (not shown) is inserted into the other end 14 and the tubular socket is crimped or otherwise secured thereto. The heading operation provides an anchoring fold having twice the wall thickness of the socket member 10, thus increasing the resistance to pull-out of the socket member.

The insulator 16, which may be made of an acrylic resin or other suitable insulating material, is molded about the headed anchor sections 12 of two socket members 10 which are oppositely positioned to each other.

The insulator is peripherally beaded as at 18 to provide the proper thickness of insulation at the headed sections which are suitably separated from each other by proper positioning during the molding process to provide a layer of insulation 20.

Inspection of FIG. 1 will clearly reveal this novel construction. It is desirable that the sectionalizer utilize a minimum of plastic; while providing at least a minimum of cross-sectional area of solid insulating material along the length of the sectionalizer, so as to ensure the sectionalizer of having at least a minimum strength in tension. It is also desirable that the sectionalizer have a maximum length of exterior surface, or exterior current path, so as to minimize the possibility of flash-over. It is additionally desirable that distance from the headed end of the tube to the exterior surface of sectionalizer be equal to the distance between the two headed ends, so as to provide the same insulation effect from the end of the end of the tube to an object on the external surface of the sectionalizer, such as a tie down wire or clamp; as between the two tube ends. Forming the bead 18 with its center in the same cross-sectional plane as the center of the heading 12, and making the distance from any point on one heading 12 to any point on the exterior surface of the insulation at least equal to the distance between the headings 12 on the two tubes 10, provides a sectionalizer, shown in FIG. 1, which meets all of these requirements.

As a result of our construction we achieve an over-all length well below the average for competing devices now in use.

The socket member may remain open at the headed section, as at 22 to reduce the number of heading operations. The plastic wall therebeyond acts as a stop for the inserted wire.

In our design the insulation electrically isolates the two conductors. It also withstands the full strain of the conductors on the sectionalizer. The insulation is not required to enter the socket member nor is the net cross-section reduced by looping the conductor through holes in the insulation.

By providing a peripheral bead in the insulator, we reduce the plastic volume of material used without loss of insulating or mechanical strength. The beaded section also reduces a likelihood of flash-over by increasing the current path between the tubular members and ensuring a proper voltage gradient between the anchor portion and the surface of the insulation by maintaining a minimum plastic depth between all metal parts of the tube 10 and the surrounding air. The design employs a minimum number of parts without loss of function. The savings in over-all length, and in production, act as a benefit to both the operator and the utility.

We have thus described the invention, but we desire it understood that it is not confined to the particular form or uses shown and described, the same being merely illustrative, and that the invention may be carried out in other ways without departing from the spirit of the invention, and therefore, we claim broadly the right to employ all equivalent instrumentalities coming within the scope of the appended claims, and by means of which objects of the invention are attained and new results accomplished, as it is obvious that the particular embodiment herein shown and described is only one of the many that can be employed to attain these objects and accomplish these results.

We claim:

1. A sectionalizing connector to mechanically join and electrically isolate two conductors, comprising: a pair of tubes, each tube including a socket portion at one end thereof for receiving and for being mechanically secured to a therein inserted conductor, and a flange at the other end thereof; said pair of tubes being spaced longitudinally along the same axis, with the flanged ends being proximal to each other although spaced apart; and an electrically insulating body molded about said flanged ends to form a unitary article therewith; wherein the outer surface of said insulating body adjacent said flanged ends is curved to form a pair of peripheral beads, each bead being shaped to form a portion of maximum diameter substantially coplanar and coaxial with each flange and a portion of less than said maximum diameter between said flanges.

2. A connector according to claim 1 wherein said tubes are formed of malleable metal, open at both ends; said sockets extending from said insulating body and being adapted to be crimped to the inserted conductors.

3. A connector according to claim 1 wherein each said flange is formed of a double thickness of the metal wall of said tube.

References Cited in the file of this patent

UNITED STATES PATENTS

| | | |
|---|---|---|
| 1,042,019 | McCarthy | Oct. 22, 1912 |
| 1,069,051 | Woodlock | July 29, 1913 |
| 2,907,814 | Raila et al. | Oct. 6, 1959 |